Figure 1:
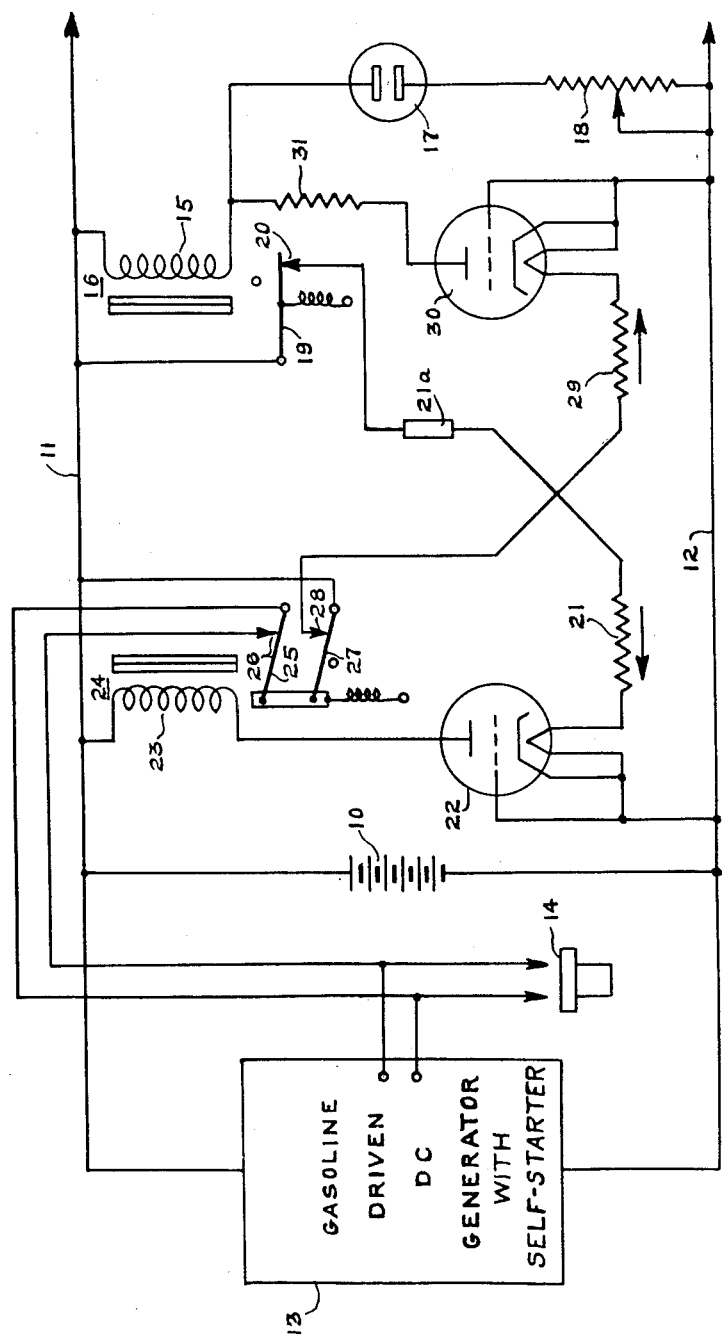

Aug. 7, 1951

E. S. PURINGTON 2,563,659

MULTIVIBRATOR CIRCUIT

Filed May 12, 1948

2 Sheets-Sheet 1

Inventor
ELLISON S. PURINGTON.
By
*signature*
Attorney

Patented Aug. 7, 1951

2,563,659

UNITED STATES PATENT OFFICE 2,563,659

MULTIVIBRATOR CIRCUIT

Ellison S. Purington, Gloucester, Mass., assignor to John Hays Hammond, Jr., Gloucester, Mass.

Application May 12, 1948, Serial No. 26,701

5 Claims. (Cl. 171—97)

This invention relates to electronic multivibrators and more specifically to multivibrators with a long period of operation which are called upon to function only occasionally, and which should consume a minimum of power during the period when they are not actively functioning.

More specifically the invention relates to devices of the above type in circuit arrangements to provide automatic control of the starting of a power driven generator for charging a storage battery. These generators are usually provided with a push button which must be held down by an attendant for an interval of time, say from five to twenty seconds, in order to start the power device such as a gasoline engine, and must be released after the engine has started and the generator is fully in operation. This release is necessary for example to prevent overheating of certain parts of the mechanism which would result if the push button were held closed for an indefinite period.

The nature of the invention will be better understood by referring to the following description taken in connection with the accompanying drawings in which certain specific embodiments have been set forth for purposes of illustration.

Figure 2:
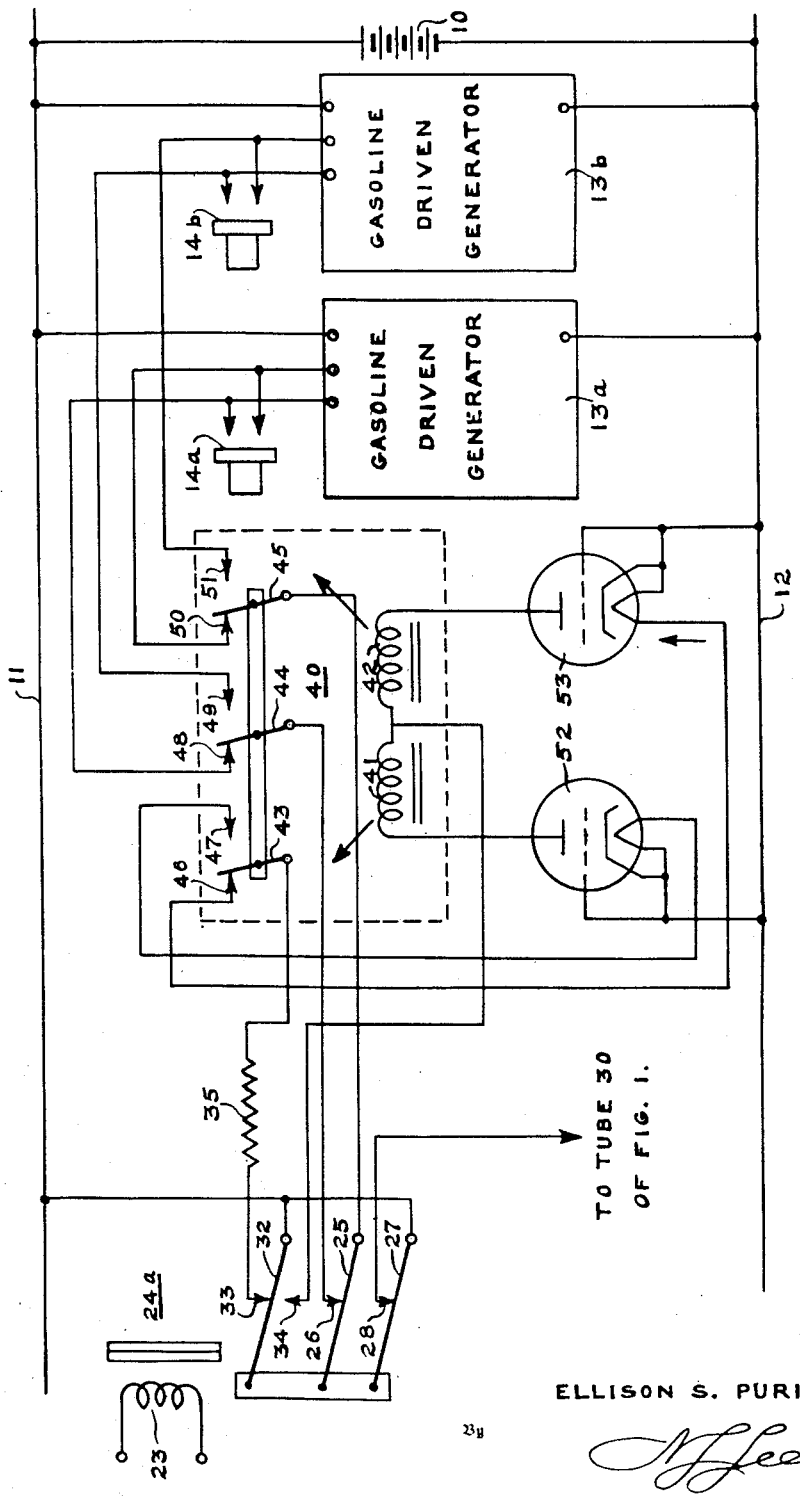

In the drawings:

Fig. 1 is a schematic diagram illustrating a system embodying the present invention; and Fig. 2 is a similar schematic diagram illustrating a further embodiment thereof.

Referring to the drawings more in detail, Fig. 1 shows a multivibrator which is of the "single shot" variety, and which is normally set into operation when the battery requires charging, goes through one cycle of operation, and is restored to normal condition when the battery commences to receive a charge. If, however, due to cold weather or other causes the generator does not respond to the first demand, the multivibrator becomes of the "free-running" type, and repeats its cycle of operation until the generator does build up the battery voltage. In the event that the generator fails to start, time limit or thermally operated devices may be used to disconnect the multivibrator so as to reduce as much as possible the load on the batteries in the absence of an attendant.

In Fig. 1, a storage battery 10 is connected between a positive bus bar 11 and a negative bus bar 12, by which busses it is also connected to a load not shown. Bridged across the busses also is a gasoline driven D. C. generator 13, which is designed to start by depressing a push button 14 for a suitable length of time. It will be understood that the gasoline driven D. C. generator includes devices not shown for cranking the engine from the storage battery, connecting the generator to the busses, and also for stopping the engine and disconnecting the generator from the busses when the battery 10 is fully charged.

For the purpose of initiating the charging of the battery 10 when, due to the discharge to the load, its voltage has fallen below a given amount, there is bridged across the bus bars in series, the winding 15 of a sensitive relay 16, a gaseous discharge device 17 such as a voltage regulator tube, and a potentiometer 18. The relay is provided with a leaf 19 with a back contact 20, such that the connection between the leaf and contact is broken when the relay is energized. During the interval when the multivibrator is not called upon to function, the armature of this relay is held in by the current through the winding 15, gas discharge device 17 and potentiometer 18. As the voltage between busses 11 and 12 drops due to discharge of the battery 10, the current through the gaseous discharge device 17 changes much more rapidly than the voltage across it, and the armature of relay 16 releases when the voltage of the battery is sufficiently low. The drop out bus bar voltage may be regulated by potentiometer 18, which if desired may be calibrated as to value of the drop out voltage. Due to electrical backlash, the armature of relay 16 will not be pulled in until the current through winding 15 is made considerably greater than the current flowing through the winding when it dropped out.

Contact 20 is connected through resistor 21 to one end of the filament of a hard electronic tube 22, which is one of the tubes of the multivibrator, preferably with a separate cathode which is indirectly heated by the filament. The cathode and the other end of the filament of tube 22 are connected to the negative bus bar 12. If this tube is a triode, as shown, the grid may be also connected to bus 12, and if it be a multi-grid tube some of the additional grids may be connected to bus bar 12, and some to the anode. The anode is connected through winding 23 of a power relay 24 to the positive bus 11. It is clear that when relay 16 drops out, the filament of tube 22 will be heated from current from positive bus 11, flowing through resistor 21 and the filament of tube 22, and after the required interval, space current from the positive bus 11 will flow through the winding 23 of relay 24, and the anode to cathode path of tube 22.

The relay 24 has two separate insulated leaves 25 and 27 which move with the armature of the relay, and one front contact for each leaf. The upper leaf 25 and its contact 26 are connected in parallel with the contacts of push button 14, and when the armature is pulled in the connection is made to start the gasoline driven generator, just as though button 14 had been pushed by an attendant.

The lower leaf 27 of relay 24 is connected to bus bar 11, and its front contact 28 is connected through resistor 29 to one end of the filament of an electronic tube 30 which is the second tube of the multivibrator. This tube may be of identical construction with tube 22, and the other end of the filament, the cathode and the grid are connected to bus bar 12. The anode plate of tube 30 is connected through resistor 31 to the junction of relay winding 15 and gaseous discharge device 17, so that space current for tube 30 flows through the relay winding 15.

Conditions have been depicted in Fig. 1 after the relay 16 has dropped its armature, causing current to flow in the filament of tube 22, and after sufficient time has elapsed so that the cathode of 22 has come up to temperature and anode current flows to pull in the armature of relay 24. This closes the starting circuit of the motor generator through contact 26. Also the connection is made from leaf 27 to contact 28, causing heating current to be applied through resistor 29 to the filament of tube 30.

When the cathode of tube 30 becomes sufficiently heated, current will flow through relay winding 15 and resistor 31, and the total amount of current through the winding 15 due to that through device 17 and device 30 will be sufficient to pull up the armature of the relay 16, thereby breaking the connection from contact 20 to the positive bus bar 11 and terminating the supply of heat for the cathode of tube 22. After sufficient lapse of time for the cathode of tube 22 to become cool, the anode current through winding 23 will drop sufficiently low so that the armature falls out, thereby terminating the closure of the starting circuit for the generator, and also cutting off the heating supply for the cathode of tube 30. When the cathode of tube 30 has cooled, the armature of its anode relay 15 may or may not again fall out. If the generator has started, then the battery 10 will be charging and due to the internal impedance of the battery, the bus bar voltage will be greater than before the cycle was initiated. In this case the armature of relay 16 will continue to be held in, preventing further cycling of the multivibrator until the generator has charged the battery, stopped, and the battery has been again discharged by its load. On the other hand, if the generator fails to start, due for example to cold weather or other causes, the relay armature will drop out and another cycle of the multivibrator will be applied to start the engine. If a protective device is desired, to prevent continued operation when the gasoline engine is defective, a thermal switch 21a may be inserted for example in the lead from contact 20 to resistor 21, controlled by the temperature of the starting motor for the gasoline engine.

It is thus seen that a multivibrator is provided using a pair of tubes 22 and 30, with the plate circuit of each controlling the flow of plate current through the other so that they fire alternately. The relay windings take the place of plate resistors of conventional multivibrators, the contacts of the relays provided for control of the action of one tube from the plate circuit of the other tube, and the control action is applied not to grids but to the filaments of the tubes. The length of the cycle is determined not by use of capacitors and resistors, but by the time required for heating and for cooling the cathodes, with some degree of adjustment provided by choice of the constants of the filament circuits. It provides for a long period multivibrator with a long period pulse to the utilization circuit, and has the added advantage that the multivibrator consumes no power during the interval when its action is not required.

In some applications in order to provide for uninterrupted service in case of failure of equipment, it is desirable to provide equipment in duplicate. In place of the arrangement of Fig. 1, additional provisions may be made so that the multivibrator will alternately control one of a pair of charging generators and then the other, in order to equalize the service, and also to provide that in case of failure of one generator to start, the control will be automatically transferred to the other generator.

In Fig. 2 is shown a circuit providing an electromagnetic toggle multivibrator arrangement for supplementing the multivibrator arrangement of Fig. 1 for use with a dual generator installation. In Fig. 2, the battery 10, bus bars 11 and 12, will be the same as in the previous Fig. 1, but two gasoline driven generators 13a and 13b with two push buttons 14a and 14b are used instead of a single generator 13 and push button 14 of the previous figure. It will be understood that the circuits of Fig. 1 will be used to actuate the winding 23 of relay 24a in accordance with a demand for charging of the battery. The relay 24a includes three leaves 25, 27 and 32 in its contact system. Thus leaf 25 and its contact 26 as connected to a work circuit as before, leaf 27 and its contact 28 are used as before to control the filament of multivibrator tube 30 of Fig. 1. In addition there is provided a third leaf 32, with a front contact 33 and a back contact 34 for operating the electronic part of the toggle system of Fig. 2.

The toggle system includes a triple pole, double-throw relay 40 with two windings 41 and 42, the leaves of the contact system being designated 43, 44, 45, and the contacts 46 to 51 inclusive. This relay is of the toggle type, such that the contacts remain in the position last set up until an impulse throws them to the opposite position. Thus the leaves of the contact system are shown as thrown to the left, due to a previous operation of the relay due to a current in winding 41. Subsequently the leaves may be switched to the right by application of a current through the winding 42. Devices of this general type are well known in the relay art and for purposes of simplification will not be here shown or described in detail. The operation of the toggle relay will be in accordance with the alternate firing of toggle tubes 52 and 53.

The work circuit leaf 25 and contact 26 of relay 24a are connected to the leaves 45 and 44 of toggle relay 40; contacts 48 and 50 are connected in parallel with the contacts of pushbutton 14a and contacts 49 and 51 are connected in parallel with the contacts of pushbutton 14b. This provides for starting of generator 13a when as depicted the relay 24a is energized and the toggle relay has been thrown to the left due to the prior passage of current through relay winding 41. The leaf 32 is connected to the positive bus-bar 11, and the front contact 33 is connected through resistor 35 to leaf 43 of relay 40. Contact 46 is connected to one side of the filament of tube 53, and contact 47 is connected to one side of the filament of tube 52. The other sides of these filaments together with the cathodes and grids, are connected to the negative bus 12. These tubes 52 and 53 may be of construction similar to tubes 22 and 30 of Fig. 1. The anode-plates of these tubes 52 and 53 are connected to ends of windings 41 and 42, and the other ends of these windings are both joined to back contact 34 of relay 24a.

As depicted, current from positive bus 11 flows through leaf 32, contact 33, resistor 35, leaf 43, contact 46 and the filament of tube 53 to the negative bus bar 12. While the relay 24a is closed to initiate the starting of generator 13a, it is also heating the cathode of tube 53 in preparation for throwing the toggle relay 40 to the other set of contacts to start generator 13b. However this operation will not be completed while relay 24a is closed, since there is no source of voltage for the anode-cathode path of the tube 53. Shortly after the time depicted, the relay 24a will release because of the operation of the multivibrator circuit of Fig. 1, and the leaf 32 will make a connection from the bus 12 to contact 34. Although there will be no longer a current to the filament of tube 53, nevertheless the cathode will continue to be heated, and space current will flow from bus-bar 11, through leaf 32, contact 34, relay winding 42 and the anode-cathode path of tube 53. This will cause the operation of the toggle relay 40 so that for the next closure of relay 24a, the control will be transferred so that generator 13b will be started, and tube 52 preconditioned for actuating the toggle when relay 24a again opens. Thus if generator 13a and its associated circuits are defective and the battery 10 does not charge, the multivibrator system of Fig. 1 will cycle again and the toggle system of Fig. 2 will operate to start generator 13b. In the event neither starts, a thermal protective device which has been indicated in Fig. 1 will protect the battery against undue load by the charging mechanism.

It will be understood that while I have depicted a multivibrator of this type as applied to the starting of a gasoline driven generator for charging the battery which supplies the multivibrator, the device may also be applied otherwise, and the invention is not to be considered in any way limited to the application here shown.

What is claimed is:

1. A multivibrator comprising a first and a second electron tube, each containing an anode and a heatable cathode, an anode circuit connected to each tube to carry anode current, a heating circuit connected to supply heating current to each cathode, a pair of electromagnetic relays having a winding connected respectively in the anode circuits of the first and second tubes and having contacts connected respectively to control the heating circuits of the second and first tubes whereby passage of anode current in each tube controls the heating circuit of the other tube.

2. A multivibrator, as set forth in claim 1, in which energization of one relay serves to open the cathode heating circuit to the second tube and actuation of the second relay serves to close the cathode heating circuit of the first tube, whereby deenergization of the first relay starts a cycle of operation having a time period determined by the heating characteristics of said cathodes.

3. In a multivibrator circuit, as set forth in claim 2, an external work circuit having a variable voltage characteristic and connected normally to energize said first relay, but to release said relay in response to a predetermined voltage drop in said work circuit, whereby said multivibrator is actuated during low voltage conditions in said work circuit.

4. A multivibrator circuit, as set forth in claim 3, in which a gas tube is connected across said work circuit in series with the winding of said first relay to control the drop and voltage of said first relay.

5. An electromagnetic toggle switch for alternately connecting a signal circuit to different utilization circuits, comprising a signal circuit carrying timed signal pulses, a pair of utilization circuits, an electromagnetic switch means for connecting said signal circuit to said respective utilization circuits, a pair of electron tubes, each having an anode and a heatable cathode, a relay actuated in response to said signal pulses, a circuit including said switch means and said relay to supply heating current to one or the other of said cathodes, when said relay is energized depending upon the position of said switch means, contacts connected to supply anode voltage to the anode of the tube when the cathode has been heated, in response to deenergization of said relay, and windings connected to be energized in response to the space current in the respective tubes to reverse the position of said switch means whereby each successive signal impulse is applied to alternate utilization circuits.

ELLISON S. PURINGTON.

REFERENCES CITED

The following references are of record in the file of this patent:

UNITED STATES PATENTS

| Number | Name | Date |
| --- | --- | --- |
| 1,192,006 | Slough | July 25, 1916 |
| 1,707,296 | Brotz | Apr. 2, 1929 |
| 1,795,053 | Strong | Mar. 3, 1931 |
| 2,047,127 | Huber | July 7, 1936 |
| 2,090,531 | Hardin | Aug. 17, 1937 |
| 2,143,501 | Synder | Jan. 10, 1939 |
| 2,458,283 | McCreary | Jan. 4, 1949 |